July 6, 1965

J. T. EPHGRAVE 3,192,778

TWIN GYRO STABILIZATION SYSTEM

Filed July 5, 1962

INVENTOR.
James T. Ephgrave
BY
Paul J. Ethington
ATTORNEY

United States Patent Office 3,192,778
Patented July 6, 1965

3,192,778
TWIN GYRO STABILIZATION SYSTEM
James T. Ephgrave, Shorewood, Wis., assignor to General Motors Corporation, Detroit, Mich., a corporation of Delaware
Filed July 5, 1962, Ser. No. 207,650
7 Claims. (Cl. 74—5.34)

This invention relates to a system for gyroscopic stabilization of a platform about a platform axis with respect to inertial space and more particularly to a system utilizing two single degree of freedom gyroscopes for each platform axis about which the platform is to be stabilized.

Single degree of freedom gyroscopes are frequently utilized for stabilizing platforms in inertial space whereby one gyroscope is utilized for each platform axis about which the platform is to be stabilized. Each gyroscope is mounted on the platform and has an input axis parallel to a platform axis about which the platform is to be stabilized, an output axis perpendicular to the input axis and a spin axis mutually perpendicular to the first two axes. Each gyroscope is provided with a gyro wheel which is caused to spin at a high rate about the spin axis whereby rotational inputs applied about the input axis of the gyroscope due to angular displacements of the platform about the platform axis will cause the wheel to precess about the output axis. The precession may be measured with a signal generator such as a microsyn which is responsive to the precession and operative to develop an electrical output signal indicative thereof. The gyroscope may have associated therewith a torque generator, such as a microsyn, responsive to control signals indicative of errors in attitude of the gyro wheel and operative to torque the wheel about the output axis so as to return the gyro wheel to its original attitude with respect to the platform. In addition, a motor may be provided which is mechanically connected with the platform and electrically connected with the signal generator and operative to rotate the platform about the platform axis in accordance with the output signals developed by the signal generator.

One problem encountered in single degree of freedom gyroscope is an error known as drift which may be defined as any unwanted rotation of a gimbal about its output axis. The effect of drift depends to some extent upon the restraint such as certain spurious torques due to the limitations of construction acting about the output axis and spin axis as well as torques due to the kinematics of the gyroscope itself. The torques which are due to the kinematics of the gyroscope include cross coupling of rotational inputs about the output axis of gyroscope and those due to such effects as kinematic rectification and anisoinertia. The torques due to cross coupling occur when external forces cause the gyroscope housing to rotate about the output axis. Thus a signal generator associated with the gyroscope will develop a signal indicative of the angular displacement of the gimbal assembly with respect to the gyroscope housing. Since it is desirable that such signals are developed only when the gyro wheel precesses due to an input torque applied about the input axis, errors are introduced in the gyroscope due to the cross coupling. The errors are related to the product of the moment of inertia about output axis and the rate of change of the angular velocity of the gyro wheel about the output axis. The torques due to kinematic rectification occur when the input axis is angularly displaced about the output axis rendering the input axis no longer perpendicular to the former position of the spin axis. Hence, the gyroscope will become sensitive to torques applied about the former position of the spin axis so as to introduce errors in the gyroscope. These errors are related to the product of the angular momentum of the gyro wheel, the angular velocity of the gyro wheel about the spin axis, and the precession of the gyro wheel about the output axis. The torques due to anisoinertia are caused by simultaneous angular oscillations about the input and spin axes and unequal gimbal inertias about those axes. The errors introduced in the gyroscope due to anisoinertia are related to the product of the difference in moments of inertia about the spin axis and input axis and the angular velocity of the gyro wheel about each of those axes.

In accordance with this invention, means are provided in a gyroscopic apparatus for eliminating from output signals representing angular precession of the gyro wheel about its output axis errors caused by torques due to the kinematics of the gyroscope which act about the spin axis and output axis of the gyro wheel. This is accomplished by mounting a pair of single degree of freedom gyroscopes on a platform. Each gyroscope has an input axis, a spin axis perpendicular to the input axis, and an output axis mutually perpendicular to the first two axes. The gyroscopes are mounted on the platform with the output axes mutually parallel or coincidental and parallel to the plane of the platform and the input axes anti-parallel. Each gyroscope has a wheel and driving means for providing rotation of the wheel in an opposite direction with respect to the wheel of the other gyroscope whereby the vector representation of the input axis and the vector representation of the spin axis of one gyroscope is of an opposite sense from the vector representation of the input axis and the vector representation of the spin axis, respectively, of the second gyroscope. Signal generating means are associated with each gyro scope operative to develop output signals in accordance with precessions of the gyro wheel about its output axis. Difference means are associated with each signal generating means and are operative to develop difference signals in accordance with the differences between the output signals developed by each signal generating means whereby the difference signals are free from certain of the errors caused by torques due to the kinematics of the gyroscope which act about the spin axis and output axis of the gyro wheel. Control means for stabilizing the platform about a platform axis may be provided mechanically connected with the platform and electrically connected with the difference means responsive to the difference signals developed thereby and operative to rotate the platform about a platform axis in accordance with the difference signals. Also, summing means may be provided for developing control signals indicative of the summations of the output signals developed by the signal generating means associated with each gyroscope. Torque generating means may be provided associated with each gyroscope responsive to the control signals and operative to rotate the gyro wheel about its output axis in accordance with the control signals so as to further eliminate the above mentioned errors in the output signals developed by the signal generating means.

A more complete understanding of this invention may be had from the detailed description which follows taken with the accompanying drawings in which.

Figure 1:
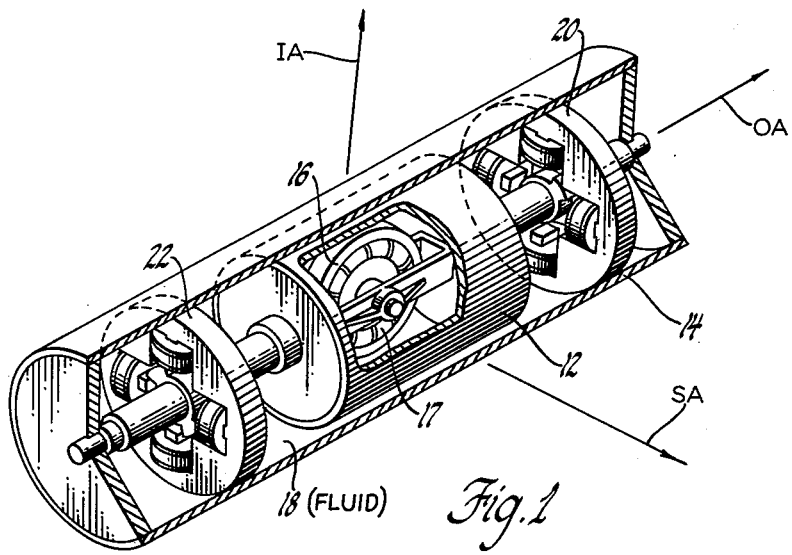
FIGURE 1 is a perspective view partly in section of a single degree of freedom gyroscope which may be used in conjunction with the embodiment of the invention shown in FIGURE 2.

Referring now to the drawings and more particularly to FIGURE 1 there is shown a single degree of freedom gyroscope including a hollow cylindrical gimbal assembly 12 rotatably supported within a hollow cylindrically shaped gyroscope housing 14, and a gyro wheel 16 mounted within the gimbal assembly 12. The gyroscope has an input axis (IA), a spin axis (SA) perpendicular to the input axis (IA) and an output axis (OA) mutually perpendicular to the other two axes. Motor means including a stator winding 17 are provided for obtaining rotation of the gyro wheel 16 about the spin axis (SA). A damping fluid 18 completely fills the spacing between the gimbal assembly 12 and the gyroscope housing 14 whereby the fluid provides a degree of buoyancy as well as damping restraint of angular displacements of the gimbal assembly 12 about the output axis (OA). An electromagnetic signal generator 20 which may take the form of a microsyn is mounted within the housing 14 for developing electrical output signals in accordance with angular displacements of the gimbal assembly 12 about the output axis (OA). In addition, an electromagnetic torque generator 22 which may take the form of another microsyn is mounted within the housing 14 operative to torque the gimbal assembly 12 about the output axis (OA) in accordance with electrical input signals applied thereto.

Figure 2:
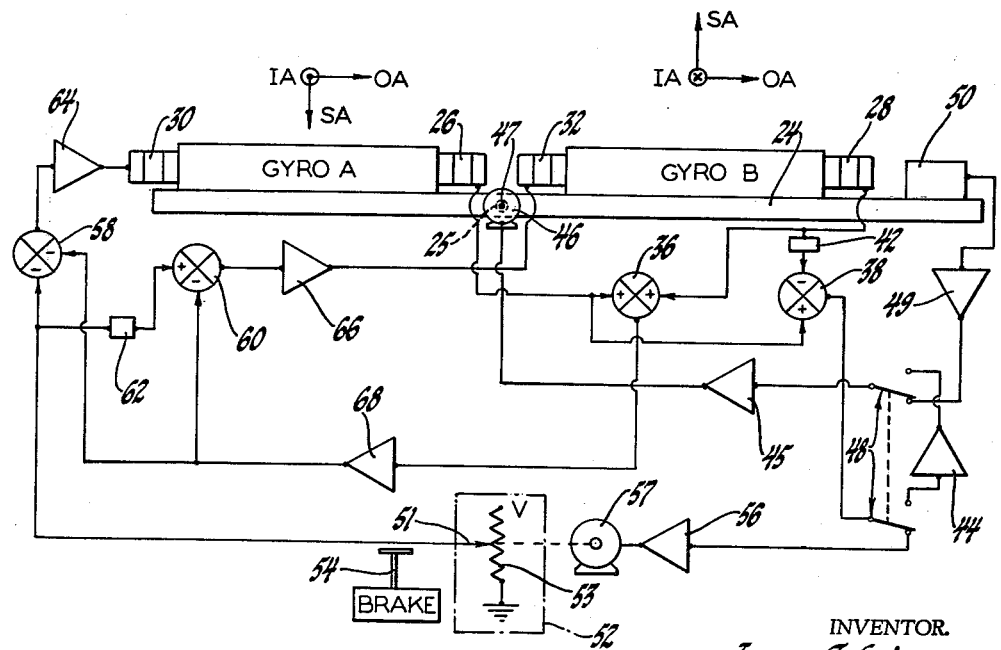
FIGURE 2 is a schematic diagram showing one embodiment of the invention.

In FIGURE 2 there is shown a schematic diagram of one embodiment of the invention wherein a platform 24 having a platform axis 25 has single degree of freedom gyroscopes A and B mounted thereon. The gyroscopes A and B are identical with the gyroscope shown in FIGURE 1 and are prealigned such that the output axes (OA) are coincidental and parallel to the plane of platform 24 and perpendicular to the axis 25, and the input axes (IA) are anti-parallel. In other words, the vector representations of the input axis (IA) and spin axis (SA) of gyroscope A are of opposite sense from the vector representations of the input axis (IA) and spin axis (SA), respectively, of gyroscope B. This is accomplished by means for spinning the gyro wheel 16 of gyroscope A in an opposite direction from that of the gyro wheel 16 of gyroscope B. Thus a rotational input applied in the same direction about the input axis (IA) of each gyroscope results in a precession of gyro wheel 16 of gyroscope A in an opposite direction from that of gyro wheel 16 of gyroscope B. Precession of the gyroscopes about the output axes tends to rotate the input axes through a plane perpendicular to the platform 24. Gyroscopes A and B have associated therewith signal generators 26 and 28, respectively, identical to the signal generator 20 shown in FIGURE 1. In addition, gyroscopes A and B have associated therewith torque generators 30 and 32, respectively, identical to the torque generator 22 shown in FIGURE 1.

The torque developed about the output axis of a single degree of freedom gyroscope may be defined by:

$$T_o = \omega_i H$$

where $T_o$ is the torque developed about the output axis of the gyroscope;
$H$ is the angular momentum of the gyro wheel;
$\omega_i$ is the angular velocity of the gyro wheel about the input axis; and the subscripts $i$ and $o$ refer to the input axis and output axis, respectively.

The Equation 1 for an ideal single degree of freedom gyroscope not acted upon by torques due to the kinematics of the gyroscope may be rewritten equating the developed torque to the reaction torques as:

$$\omega_i H = I_o \frac{d^2\theta_o}{dt^2} + D\frac{d\theta_o}{dt} \quad (2)$$

where $I_o$ is the moment of inertia about the output axis;
$D$ is the damping coefficient;
$t$ is time; and
$\theta$ is the gyroscope output angle.

However, a single degree of freedom gyroscope is subject to drift due to torques resulting from the kinematics of the gyroscope as mentioned hereinbefore. Some of these torques are due to cross coupling of rotational inputs applied about the output axis and others are due to such effects as kinematic rectification and anisoinertia. With these torques present Equation 1 may be re-written as:

$$T_o = H(\omega_i - \theta_o \omega_s) + (I_s - I_i)(\omega_s \omega_i - I_o \frac{d\omega_o}{dt}) + M \quad (3)$$

where $\omega_s$ is the angular velocity of the gyro wheel about the spin axis;
$\omega_o$ is the angular velocity of the gyro wheel about the output axis;
$I_s$ is the moment of inertia about the spin axis;
$I_i$ is the moment of inertia about the input axis; and
$M$ is the feedback torque.

The term $$I_o \frac{d\omega_o}{dt}$$

represents torques due to cross coupling, the term $H\theta\omega_s$ represents kinematic rectification or coning and the term $(I_s - I_i)\omega_s\omega_i$ represents torques due to anisoinertia effects. These terms as well as the feedback torque $M$ represent unwanted terms in Equation 3, in view of Equation 2 for an ideal single degree of freedom gyroscope.

The torque equation for gyroscope A in view of Equation 2 may be written as:

$$H\omega_{ia} = I_o \frac{d^2\theta_a}{dt^2} + D\frac{d\theta_a}{dt} \quad (4)$$

where the subscript $a$ represents gyroscope A.
Combining Equation 4 to Equation 3, we obtain:

$$I_o\frac{d^2\theta_a}{dt^2} + D\frac{d\theta_a}{dt} = H(\omega_{ia} - \theta_a\omega_{sa}) + (I_s - I_i)\omega_{sa}\omega_{ia} - I_o\frac{d\omega_{oa}}{dt} + M_a \quad (5)$$

Similarly, the torque equation for gyroscope B in view of Equations 2 and 3 may be written as:

$$I_o\frac{d^2\theta_b}{dt^2} + D\frac{d\theta_b}{dt} = H(\omega_{ib} - \theta_b\omega_{sb}) + (I_s - I_i)\omega_{sb}\omega_{ib} - I_o\frac{d\omega_{ob}}{dt} + M_b \quad (6)$$

where the subscript $b$ represents gyroscope B.

However, since the vector representations of the input axis (IA) and spin axis (SA) of gyroscopes A and B are parallel but of opposite sense the angular velocities and the feedback torques may be equated as:

$$\omega_{ia} = -\omega_{ib}$$
$$\omega_{oa} = \omega_{ob}$$
$$\omega_{sa} = -\omega_{sb}$$
$$M_a = M_b$$

and substituting appropriate terms in Equation 6, we obtain:

$$I_o\frac{d^2\theta_b}{dt^2} + D\frac{d\theta_b}{dt} = H(-\omega_{ia} + \theta_b\omega_{sa}) + (I_s - I_i)\omega_{sa}\omega_{ia} - I_o\frac{d\omega_{oa}}{dt} + M_a \quad (7)$$

Subtracting Equation 7 from Equation 5, we obtain:

$$I_o\left(\frac{d^2\theta_a}{dt^2} - \frac{d^2\theta_b}{dt^2}\right) + D\left(\frac{d\theta_a}{dt} - \frac{d\theta_a}{dt}\right) = 2H\omega_{ia} - H(\theta_a + \theta_b)\omega_{sa} \quad (8)$$

Thus by subtracting Equation 7 from Equation 5 certain of the terms in Equation 3 have been eliminated, namely the term $(I_s - I_i)\omega_s\omega_i$ which represents the anisoinertia effects and the term $$I_o\frac{d\omega_o}{dt}$$

which represents cross coupling. Furthermore, if the term $H(\theta_a + \theta_b)\omega_{sa}$ which represents kinematic rectification can be eliminated we will be left with the equation of an ideal single degree of freedom gyroscope which may be represented by:

$$I_0\left(\frac{d^2\theta_a}{dt^2}-\frac{d^2\theta_b}{dt^2}\right)+D\left(\frac{d\theta_a}{dt}-\frac{d\theta_b}{dt}\right)=2H\omega_{ia} \qquad (9)$$

In accordance with this invention, the unwanted terms in Equations 5, 7 and 8 may be eliminated with the circuitry shown in FIGURE 2. The output of the signal generator 26 is electrically connected with an input of a summing amplifier 38 and the output of the signal generator 28 is electrically connected with another input of the summing amplifier 38 via a phase inverter 42 so as to obtain difference signals therefrom which are free from certain errors due to the kinematics of the gyroscope. The output of the summing amplifier 38 is electrically connected with an input of a motor 46 via switching means 48 and amplifying means 44 and 45. The motor 46 is in turn mechanically connected with the platform 24 via a shaft 47 coaxial with the platform axis 25 and operative to rotate the platform 24 about axis 25 in accordance with output signals developed by the summing amplifier 38. The output of each signal generator 26 and 28 is also connected with an input of a summing amplifier 36 so as to obtain compensating torque signals therefrom to further eliminate certain errors in the output signals developed by the signal generating means which are due to the kinematics of the gyroscope. The output of the summing amplifier 36 is electrically connected with an input of a summing amplifier 58 and with an input of a summing amplifier 60 via amplifying means 68. The output of the summing amplifier 58 is connected with the input of the torque generator 30 via amplifying means 64 and the output of the summing amplifier 60 is connected with the input of the torque generator 32 via amplifying means 66.

With the switching means 48 in its down position the input of the motor 46 is electrically connected with an erection system including an external attitude sensing device 50, which is mounted on the platform 24, via the switching means 48 and amplifying means 49 and 45 for initially aligning the platform 24 with respect to inertial space. The output of the summing amplifier 38 is electrically connected with a servo motor 57 via the switching means 48 and amplifying means 56. The servo motor 57 is mechanically connected with a wiper arm 51 of a memory potentiometer 52. The wiper arm 51 is maintained in slidable engagement with a resistance element 53 of the potentiometer 52 which has an alternating reference source V applied thereacross. Suitable braking means 54 is provided for holding the wiper arm fixed with respect to the element 53 for obtaining reference signal voltages therefrom of constant value. The wiper arm 51 is electrically connected with an input of the summing amplifier 58 and with an input of the summing amplifier 60 via a phase inverter 62.

During the initial erection of the platform 24 the switching means 48 is in its down position and the external attitude sensing device 50 will produce an attitude signal indicative of attitude conditions which is in turn applied to the input of the motor means 46 via the switching means 48 so as to erect the platform 24. However, due to earth rate and other constant torques, there will be some precession of the gyro wheels 16 of gyroscopes A and B about their output axes (OA) whereby the signal generators 26 and 28 will be responsive thereto and develop output signals in accordance therewith. The output signals are applied to the summing amplifier 38 which is operative to develop a control signal indicative of the difference between the output signals. The control signal is applied to the servo motor 57 via the switching means 48 and amplifying means 56 for driving the wiper arm 51 with respect to the resistance element 53. The arm 51 is then held fixed with respect to the element 53 by the braking means 54 so as to provide a reference signal voltage to the input of summing amplifiers 58 and 60 indicative of earth rate and other constant torques. Since the output control signals developed by the summing amplifiers 58 and 50 are applied to the torque generators 30 and 32, respectively, the effects of earth rate and other constant torques acting on gyroscopes A and B are compensated for.

The output signals developed by the signal generator 26 are applied to an input of the summing amplifier 38 and the output signals developed by the signal generator 28 are applied to another input of the summing amplifier 38 via the phase inverter 42. The control signals developed by the summing amplifier 38 are indicative of the differences between the output signals developed by the signal generators and hence are represented by Equation 8. When the switching means 48 is in its up position the control signals are applied to the input of the motor 46 which is operative to rotate the shaft 47 and hence the platform 24 about the platform axis 25 in accordance with the control signals. Hence in this manner both cross coupling $$I_0\frac{d\omega_o}{dt}$$

and anisoinertia effects $(I_s-I_i)\omega_s\omega_i$ are eliminated. If a torque proportional to $(\theta_a+\theta_b)$ is fed back to the torque generators of gyroscopes A and B kinematic rectification $H(\theta_a+\theta_b)\omega_{sa}$ will be eliminated. This is accomplished with the summing amplifier 36 which sums the output signal developed by the signal generator 26 and the output signal developed by the signal generator 28 and applies the resultant signal through summing amplifiers 58 and 60 to the inputs of torque generators 30 and 32 via amplifying means 64 and 66, respectively. Thus in this manner the gyro wheels 16 of gyroscopes A and B are torqued about their output axes so as to reduce kinematic rectification $H(\theta_a+\theta_b)\omega_{sa}$ to a negligible value.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. In a gyroscopic apparatus, means for eliminating from output signals representing angular precessions of the gyro wheel about its output axis errors caused by torques due to the kinematics of the gyroscope which act about the spin axis and output axis of the gyro wheel comprising a platform, first and second single degree of freedom gyroscopes mounted on the platform, each gyroscope having an input axis, a spin axis perpendicular to the input axis and an output axis mutually perpendicular to the input axis and the spin sxis, the gyroscopes being prealigned with the output axes parallel and the input axes anti-parallel, each gyroscope including a gyro wheel adapted to spin about the spin axis whereby the wheel is caused to precess about the output axis in accordance with torques applied about the input axis, driving means for providing rotation of the wheel of the first gyroscope in an opposite direction with respect to the wheel of the second gyroscope whereby the vector representation of the input axis and the vector representation of the spin axis of the first gyroscope is of an opposite sense from the vector representation of the input axis and the vector representation of the spin axis, respectively, of the second gyroscope, each gyroscope having a signal generating means associated therewith operative to develop output signals in accordance with precessions of the wheel about its output axis, and difference means associated with each signal generating means and operative to develop difference signals in accordance with the differences between the output signals developed by the signal generating means asociated with the first gyroscope and the signal generating means associated with the second gyroscope whereby the difference signals are free from errors caused by torques due to the kinematics of the gyroscope which act about the spin axis and output axis of the gyro wheel.

2. Apparatus for stabilizing a platform about a platform axis comprising a platform having a platform axis, first and second single degree of freedom gyroscopes mounted on the platform, each gyroscope having an input axis, a spin axis perpendicular to the input axis and an output axis mutually perpendicular to the input axis and the spin axis, the gyroscopes being prealigned with the output axes parallel and the input axes anti-parallel, the output axes being parallel with the platform and perpendicular to the platform axis, each gyroscope including a gyro wheel adapted to spin about the spin axis whereby the wheel is caused to precess about the output axis in accordance with torques applied about the input axis, driving means for providing rotation of the wheel of the first gyroscope in an opposite direction with respect to the wheel of the second gyroscope whereby the vector representation of the input axis and the vector representation of the spin axis of the first gyroscope is of an opposite sense from the vector representation of the input axis and the vector representation of the spin axis, respectively, of the second gyroscope, each gyroscope having a signal generating means associated therewith operative to develop output signals in accordance with precessions of the wheel about the output axis, summing amplifier means electrically connected with each signal generating means and operative to develop control signals in accordance with the differences between the output signals developed by the signal generating means associated with the first gyroscope and the signal generating means associated with the second gyroscope, and control means electrically connected with the summing amplifier means responsive to control signals developed thereby and mechanically connected with the platform whereby the control means is operative to orient the platform about the platform axis in acordance with the control signals.

3. Apparatus for stabilizing a platform about a platform axis comprising a platform having a platform axis, a first and second single degree of freedom gyroscopes mounted on the platform, each gyroscope having an input axis, a spin axis perpendicular to the input axis and an output axis mutually perpendicular to the input axis and the spin axis, the gyroscopes being prealigned with the output axes parallel and the input axes anti-parallel, the output axes being parallel with the platform and perpendicular to the platform axis, each gyroscope including a gyro wheel adapted to spin about the spin axis whereby the wheel is caused to precess about the output axis in accordance with torques applied about the input axis, driving means for providing rotation of the wheel of the first gryoscope in an opposite direction with respect to the wheel of the second gyroscope whereby the vector representation of the input axis and the vector representation of the spin axis of the first gyroscope is of an opposite sense from the vector representation of the input axis and the vector representation of the spin axis, respectively, of the second gyroscope, signal generating means associated with each gyroscope and operative to develop output signals in accordance with precessions of the wheel about the output axis, summing amplifier means electricaly connected with each signal generating means and operative to develop control signals in accordancce with the summations of the output signals developed by the signal generating means associated with the first gyroscope and the signal generating means associated with the second gyroscope, and torque generating means associated with each gyroscope and electrically connected with the summing amplifier means responsive to control signals developed thereby and operative to torque the wheel of the gyroscope about the output axis in accordance with the control signals.

4. Apparatus for stabilizing a platform having a platform axis comprising a platform having a platform axis, first and second single degree of freedom gyroscopes mounted on the platform, each gyroscope having an input axis, a spin axis perpendicular to the input axis and an output axis mutually perpendicular to the input axis and the spin axis, the gyroscopes being prealigned with the output axes parallel and the input axes anti-parallel, the output axes being parallel with the platform and perpendicular to the platform axis, each gyroscope including a gyro wheel adapted to spin about the spin axis whereby the wheel is caused to precess about the output axis in accordance with torques applied about the input axis, driving means for providing rotation of the wheel of the first gyroscope in an opposite direction with respect to the wheel of the second gyroscope whereby the vector representation of the input axis and the vector representation of the spin axis of the first gyroscope is of an opposite sense from the vector representation of the input axis and the vector representation of the spin axis, respectively, of the second gyroscope, signal generating means associated with each gyroscope and operative to develop output signals in accordance with precessions of the wheel about the output axis, first summing amplifier means electrically connected with each signal generating means and operative to develop first control signals in accordance with the differences between the output signals developed by the signal generating means associated with the first gyroscope and the signal generating means associated with the second gyroscope, control means electrically connected with the first summing amplifier means responsive to the first control signals developed thereby and mechanically connected with the platform whereby the control means is operative to orient the platform about the platform axis is accordance with the first control signals, second summing amplifier means electrically connected with each signal generating means and operative to develop second control signals in accordance with the summations of the output signals developed by the signal generating means associated with the first gyroscope and the signal generating means associated with the second gyroscope, and torque generating means associated with each gyroscope and electrically connected with the second summing amplifier means responsive to the second control signals developed thereby and operative to torque the wheel of the gyroscope about the output axis in accordance with the second control signals.

5. Apparatus for stabilizing a platform about a platform axis comprising a platform having a platform axis, first and second single degree of freedom gyroscopes mounted on the platform, each gyroscope having an input axis, a spin axis perpendicular to the input axis and an output axis mutually perpendicular to the input axis and the spin axis, the gyroscopes being prealigned with the output axes parallel and the input axes anti-parallel, the output axes being parallel with the platform and perpendicular to the platform axis, each gyroscope including a gyro wheel adapted to spin about the spin axis whereby the wheel is caused to precess about the output axis in accordance with torques applied about the input axis, driving means for providing rotation of the wheel of the first gyroscope in an opposite direction with respect to the wheel of the second gyroscope whereby the vector representation of the input axis and the vector representation of the spin axis of the first gyroscope is of an opposite sense from the vector representation of the input axis and the vector representation of the spin axis, respectively, of the second gyroscope, each gyroscope having a signal generating means associated therewith operative to develop output signals in accordance with precessions of the wheel about the output axis, summing amplifier means electrically connected with each signal generating means and operative to develop control signals in accordance with the differences between the output signals developed by the signal generating means associated with the first gyroscope and the signal generating means associated with the second gyroscope, control means electrically connectable with the summing amplifier means responsive to control signals developed thereby and mechanically connected with the platform whereby the control means is operative to orient the platform about the platform axis in accordance with the control signals, attitude sensing means responsive to attitude conditions and operative to develop attitude signals in accordance therewith, the control means being electrically connectable with the attitude sensing means responsive to the attitude signals developed thereby and operative to orient the platform about the platform axis in accordance with the attitude signals and switch means for selectively connecting the control means with the summing amplifier means and the attitude sensing means.

6. Apparatus for stabilizing a platform about a platform axis comprising a platform having a platform axis, first and second single degree of freedom gyroscopes mounted on the platform, each gyroscope having an input axis, a spin axis perpendicular to the input axis and an output axis mutually perpendicular to the input axes and the spin axis, the gyroscopes being prealigned with the output axes parallel and the input axes anti-parallel, the output axes being parallel with the platform and perpendicular to the platform axis, each gyroscope including a gyro wheel adapted to spin about the spin axis whereby the wheel is caused to precess about the output axis in accordance with torques applied about the input axis, driving means for providing rotation of the wheel of the first gyroscope in an opposite direction with respect to the wheel of the second gyroscope whereby the vector representation of the input axis and the vector representation of the spin axis of the first gyroscope is of an opposite sense from the vector representation of the input axis and the vector representation of the spin axis, respectively, of the second gyroscope, signal generating means associated with each gyroscope and operative to develop output signals in accordance with precessions of the wheel about the output axis, first summing amplifier means electrically connected with each signal generating means and operative to develop first control signals in accordance with the differences between the output signals developed by the signal generating means associated with the first gyroscope and the signal generating means associated with the second gyroscope, control means electrically connectable with the first summing amplifier means responsive to the first control signals developed thereby and mechanically connected with the platform whereby the control means is operative to orient the platform about the platform axis in accordance with the first control signals, second summing amplifier means electrically connected with each signal generating means and operative to develop second control signals in accordance with the summation of the output signals developed by the signal generating means associated with the first gyroscope and the signal generating means associated with the second gyroscope, attitude sensing means responsive to attitude conditions and operative to develop attitude signals in accordance therewith, the control means being electrically connectable with the attitude sensing means responsive to the attitude signals developed thereby and operative to orient the platform about the platform axis in accordance with the attitude signals, switching means for selectively connecting the control means to the first summing amplifier means and the attitude sensing means, and torque generating means associated with each gyroscope and electrically connected with the second summing amplifier means responsive to the second control signals developed thereby and operative to torque the wheel of the gyroscope about the output axis in accordance with the second control signals.

7. Apparatus for stabilizing a platform about a platform axis compirsing a platform having a platform axis, first and second single degree of freedom gyroscopes mounted on the platform, each gyroscope having an input axis, a spin axis perpendicular to the input axis and an output axis mutually perpendicular to the input axis and the spin axis, the gyroscopes being prealigned with the output axes parallel and the input axes anti-parallel, the output axes being parallel with the platform and perpendicular to the platform axis, each gyroscope including a gyro wheel adapted to spin about the spin axis whereby the wheel is caused to precess about the output axis in accordance with torques applied about the input axis, driving means for providing rotation of the wheel of the first gyroscope in an opposite direction with respect to the wheel of the second gyroscope whereby the vector representation of the input axis and the vector representation of the spin axis of the first gyroscope is of an opposite sense from the vector representation of the input axis and the vector representation of the spin axis, respectively, of the second gyroscope, signal generating means associated with each gyroscope and operative to develop output signals in accordance with precessions of the wheel about the output axis, first summing amplifier means electrically connected with each signal generating means and operative to develop first control signals in accordance with the differences between the output signals developed by the signal generating means associated with the first gyroscope and the signal generating means associated with the second gyroscope, control means electrically connectable with the first summing amplifier means responsive to the first control signals developed thereby and mechanically connected with the platform whereby the control means is operative to orient the platform about the platform axis in accordance with the first control signals, second summing amplifier means electrically connected with each signal generating means and operative to develop second control signals in accordance with the summations of the output signals developed by the signal generating means associated with the first gyroscope and the signal generating means associated with the second gyroscope, attitude sensing means responsive to attitude conditions and operative to develop attitude signals in accordance therewith, the control means being electrically connectable with the attitude sensing means responsive to the attitude signals developed thereby and operative to orient the platform about the platform axis in accordance with the attitude signals, switch means for selectively connecting the control means to the first summing amplifier means and the attitude sensing means, torque generating means associated with each gyroscope and electrically connected with the second summing amplifier means responsive to the second control signals developed thereby and operative to torque the wheel of the gyroscope about the output axis in accordance with the second control signals, and memory means connected with the first summing amplifier means and responsive to the signals developed thereby to develop reference signal voltages indicative of the signals, each torque generating means being electrically connected with the memory means and responsive to the reference signal voltages developed thereby to torque the wheel of the gyroscope about the output axis in accordance with the reference signal voltages.

References Cited by the Examiner
UNITED STATES PATENTS
3,050,995  8/62  Dozier _____ 75—5.34 X
FOREIGN PATENTS
200,496  12/55  Australia.

BROUGHTON G. DURHAM, *Primary Examiner.*